UNITED STATES PATENT OFFICE.

ARTHUR P. AYLING, OF MILWAUKEE, WISCONSIN.

COMPOSITION FOR MANUFACTURING GLASS.

SPECIFICATION forming part of Letters Patent No. 552,091, dated December 31, 1895.

Application filed September 28, 1895. Serial No. 563,952. (No specimens.)

*To all whom it may concern:*

Be it known that I, ARTHUR P. AYLING, of Milwaukee, in the county of Milwaukee and State of Wisconsin, have invented certain new and useful Improvements in Compositions for Manufacturing Glass; and I do hereby declare that the following is a full, clear, and exact description of the invention, which will enable others skilled in the art to which it pertains to make and use the same.

The main object of my invention is to produce an inexpensive composition for the manufacture of what is commonly known as "amber" bottle-glass.

It consists of the composition of matter hereinafter particularly described, and pointed out in the claims.

To produce my improved composition I take the following proportions by weight of sand, such as is ordinarily used in the manufacture of glass; finely crushed, broken or pulverized furnace-slag, which is composed mainly of silicate of lime; clay, preferably in the form of pulverized or broken brick, and salt-cake, which is a by-product of the manufacture of hydrochloric acid: one hundred and forty parts of sand, seventy parts of slag, fifty parts of clay, and seventy parts of salt-cake. These ingredients composing the batch are first intimately mingled and then melted together in the ordinary manner in crucibles or tank-furnaces commonly used in the manufacture of glass. An inexpensive easily-wrought metal is thus produced from which a strong tough glass of an amber or reddish-brown color, suitable for bottles of various kinds, or other articles, may be made.

The proportions of the ingredients above stated may be varied within certain limits, and the clay may be altogether dispensed with. When the clay is not used the remaining ingredients are preferably combined in about the following proportions by weight: one hundred and seventy parts of sand, sixty-five parts of slag, and sixty-five parts of salt-cake. I prefer, however, to use clay with the other ingredients in substantially the proportions first given, as a more easily worked metal and glass of superior strength and quality are thus produced. Heretofore it has been necessary to employ expensive materials, including the very finest, purest grades of soda, to secure the desired amber or brown color which I obtain with my improved composition.

The materials of which my composition consists are easily obtainable as waste products at little or no cost, except that of handling. The cost of glass produced therefrom is, therefore, reduced to a minimum.

The variety of clay which I have thus far used in my composition and from which I have obtained satisfactory results is that found in the vicinity of Milwaukee, Wisconsin, from which the well-known Milwaukee cream-colored brick are made; but I do not wish to limit myself to any particular kind of clay as other varieties may be used with success. When they can be had, I prefer to use pulverized brick, because in this form the clay is in better condition for melting. Where they are manufactured in considerable quantities a sufficient supply of broken or imperfect brick can be readily obtained for the purpose with little expense.

I am aware that it has been proposed to employ molten slag as it runs from a smelting-furnace for the manufacture of glass or vitreous material, by the admixture therewith of silicious material and alkali, with or without other materials; but the difficulty of properly mixing the ingredients by this process, a prime object of which is to save and utilize the heat of the molten slag, is so great that it has proved impracticable.

In the practical manufacture of glass with my improved composition it is indispensable that the slag be finely broken, crushed, or pulverized and intimately mixed with the other ingredients before melting.

I claim—

1. A composition for the manufacture of amber glass consisting of sand, pulverized or broken slag and salt-cake, mixed and melted together in about the proportions specified, substantially as and for the purposes set forth.

2. A composition for the manufacture of glass consisting of sand, slag, clay and salt-cake, substantially as and for the purposes set forth.

3. A composition for the manufacture of glass, consisting of sand, slag, clay and salt-cake in about the following proportions by weight: one hundred and forty parts of sand, seventy parts of slag, fifty parts of clay and seventy parts of salt-cake, substantially as and for the purposes set forth.

In testimony that I claim the foregoing as my own I affix my signature in presence of two witnesses.

ARTHUR P. AYLING.

Witnesses:
ALICE E. GOSS,
CHAS. L. GOSS.